United States Patent [19]
Bowen

[11] Patent Number: 5,815,157
[45] Date of Patent: Sep. 29, 1998

[54] METHOD AND APPARATUS FOR TEXTURE BORDER ADDRESS MAPPING IN RECTANGULAR COORDINATES

[75] Inventor: Andrew D. Bowen, San Jose, Calif.

[73] Assignee: International Business Machines Corporation, Armonk, N.Y.

[21] Appl. No.: 570,218

[22] Filed: Dec. 11, 1995

[51] Int. Cl.$^6$ ........................................ G09B 5/00
[52] U.S. Cl. ........................................ 345/430; 345/509
[58] Field of Search ........................ 345/144, 189, 345/201, 203, 185, 187, 192, 430; 395/125, 130, 507, 508

[56] References Cited

U.S. PATENT DOCUMENTS

| | | | |
|---|---|---|---|
| 5,448,264 | 9/1995 | Pinedo et al. | 345/203 |
| 5,461,712 | 10/1995 | Chelstowski et al. | 345/514 |
| 5,548,709 | 8/1996 | Hannah et al. | 345/510 |
| 5,610,630 | 3/1997 | Nakamura et al. | 345/119 |

*Primary Examiner*—Steven J. Saras
*Assistant Examiner*—Xu-Ming Wu
*Attorney, Agent, or Firm*—David H. Mims, Jr.

[57] ABSTRACT

An addressing scheme for efficient memory use for storing textures with borders. Memory space is allocated for the texture maps, borders, and submaps equaled to two times the width times the height of the texture map to be stored. The memory space is then divided into a rectangular map space having a left-hand portion and a right-hand portion. Storage is accomplished by storing the main texture map on the left-hand portion of the map space. Submaps are then aligned along the bottom edge of the map space at the right in the right-hand portion. Finally, the borders are stored beginning at the top of the right-side portion of the rectangular space. The four corner edges of the borders are stored below the texel borders in the right-side portion.

17 Claims, 5 Drawing Sheets

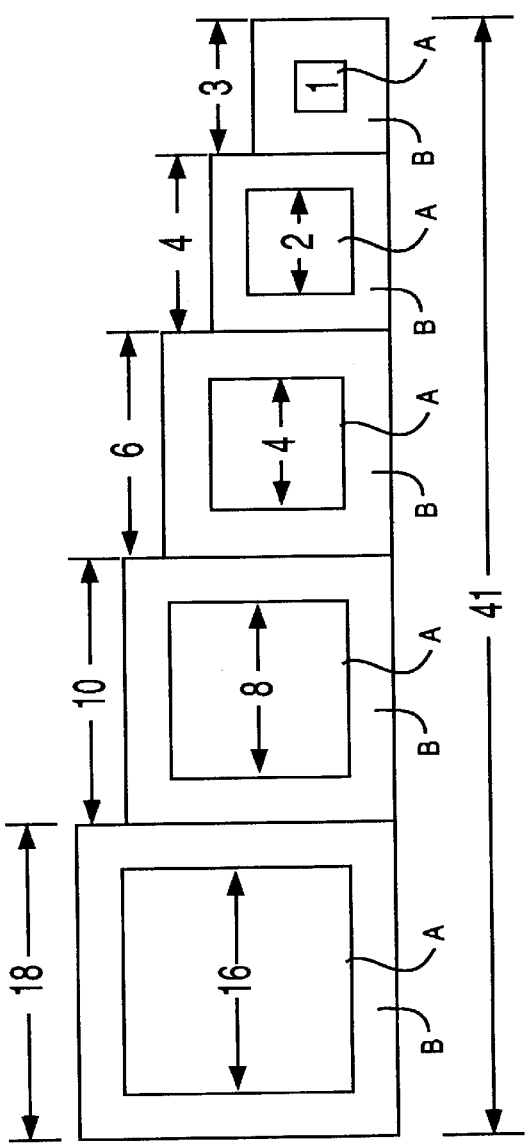
FIG. 1A
FIG. 1B
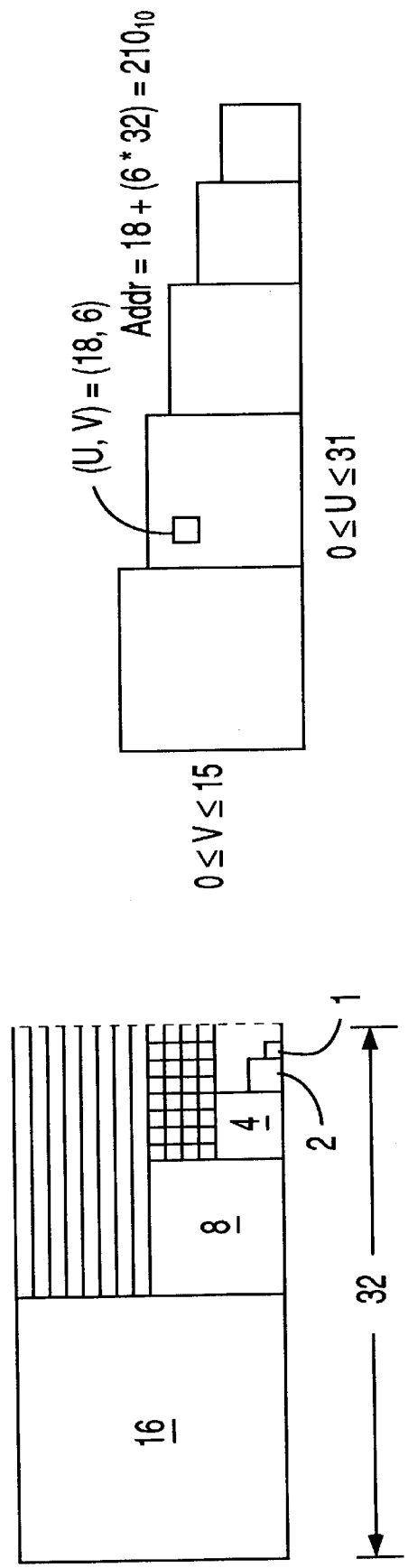
FIG. 4

METHOD AND APPARATUS FOR TEXTURE BORDER ADDRESS MAPPING IN RECTANGULAR COORDINATES

FIELD OF THE INVENTION

The present invention relates to data processing systems, and more particularly, to providing efficient memory mapping for texture maps with borders.

BACKGROUND OF THE INVENTION

Texture mapping is the application of a two or three-dimensional image to a surface based on a (typically) linear transform. Texture maps include, but are not limited to, reflection maps which are images of all geometric objects in a scene surrounding a reflective surface. For example, a texture map may show a room as reflected in a mirror or procedural textures which include precise definitions of the "look" of a texture, such as, an irregular stone wall pattern that uses some random number sequence to build more natural looking rocks, or a wood grain texture that looks different when "sliced" in different directions. While texture mapping is commonly used in the computer graphics area, it is nevertheless very expensive because the volume of a texture image data is huge, and the requisite texture memories storing the texture image data are very expensive. Some systems require the storage of texture image data in duplicate because of calculation speed enhancement further exacerbating the memory problem.

It is well known in the art that texture maps may be handled as patches in a rectangular address space. As appreciated by those skilled in the art, rectangular mapping requires the memory texture space have a specific width and height. However, rectangular mapping has severe problems when textures contain borders. A texture border, as used in this invention, is a one or more texel wide band around a texture map. The addition of a border reduces maximum texture memory size by a factor of two in both axis. For example, when standard rectangular mapping techniques are employed, a 512×512 texture can be stored without a border. When there is a border, the limit is 256×256 (actually, 257×257) including the border.

One technique for reducing the high requirement of texture memories consists of interleaving and storing texture image data in a plurality of texture memory clusters. Texel values which contain the color values in a texture image are interleaved and stored in a plurality of texture memory clusters. The texture memory clusters communicate the texel values needed in each of the texture memory clusters to each other. Moreover, texel values are interleaved and stored in a plurality of memory banks included by each of the texture memory clusters. While this technique reduces duplication of texture image data without lowering calculation speed, it is still inefficient due to the storage of texture maps as patches and an inability to efficiently handle textures with borders.

It is therefore desirable to have a modified rectangular mapping scheme for efficient memory usage for textures with borders, while simplifying hardware requirements and extendable to linear memory management.

SUMMARY OF THE INVENTION

This invention relates to a method and apparatus for providing an addressing scheme for efficient memory use for storing textures with borders. Memory space is allocated for the texture maps, borders, and submaps equaled to two times the width times the height of the texture map to be stored. The memory space is then divided into a rectangular map space having a left-hand portion of W×H, and a right-hand portion of successive one-half W×H portions down to a 1×1map. Storage of a W×H texture map with its accompanying borders is accomplished by storing the main texture map on the left-hand portion of the map space. The submaps are then aligned along the bottom edge of the right-hand portion of the map space to the right. Finally, the borders are stored beginning at the top of the right-side portion of the rectangular space. The borders represent only the texel borders and not the corners of the borders. The four corners of the borders are stored below the texel borders in the lower-right portion of the rectangular map space with the four corners of the 1×1map.

BRIEF DESCRIPTION OF THE DRAWINGS

FIGS. 1A and 1B illustrate a texture map with borders and the modified rectangular mapping scheme for its storage, respectively.

FIG. 4 is an example of the invention extended for operation in a linear address space.

DETAILED DESCRIPTION OF THE EMBODIMENTS

This invention provides a method and apparatus for efficiently storing texture maps. Texture mapping enables the modeling of the complexity of real world surface images. As known to those skilled in the art, "texture mapping" means mapping of a function onto a surface in three dimensions. Many parameters have been texture mapped in the past. Some of these include surface color, specular reflection, normal vector perturbation, secularity, transparency, diffuse reflection, shadows, and local coordinate system or "frame mapping." In texture mapping, a source image known as the "texture" is mapped onto a surface in three-dimensional "object" space. The three-dimensional surface is then mapped to the destination image, which is generally a graphics display screen. One skilled in the art appreciates that standard rectangular mapping method have severe problems dealing with the concept of texture borders. A texture border is a one or more texel wide band around a texture map. FIG. 1A illustrates texture maps "A" with borders "B". Using standard rectangular mapping techniques, the effective texture size that can be stored is reduced by a factor of two in both axis. For example, a 512×512 texture can be stored without a border. Using a border, the limit is 256×256. The invention provides for the storage of the texture maps with borders shown in FIG. 1A, in a modified rectangular memory mapping scheme shown in FIG. 1B.

Figure 1C:
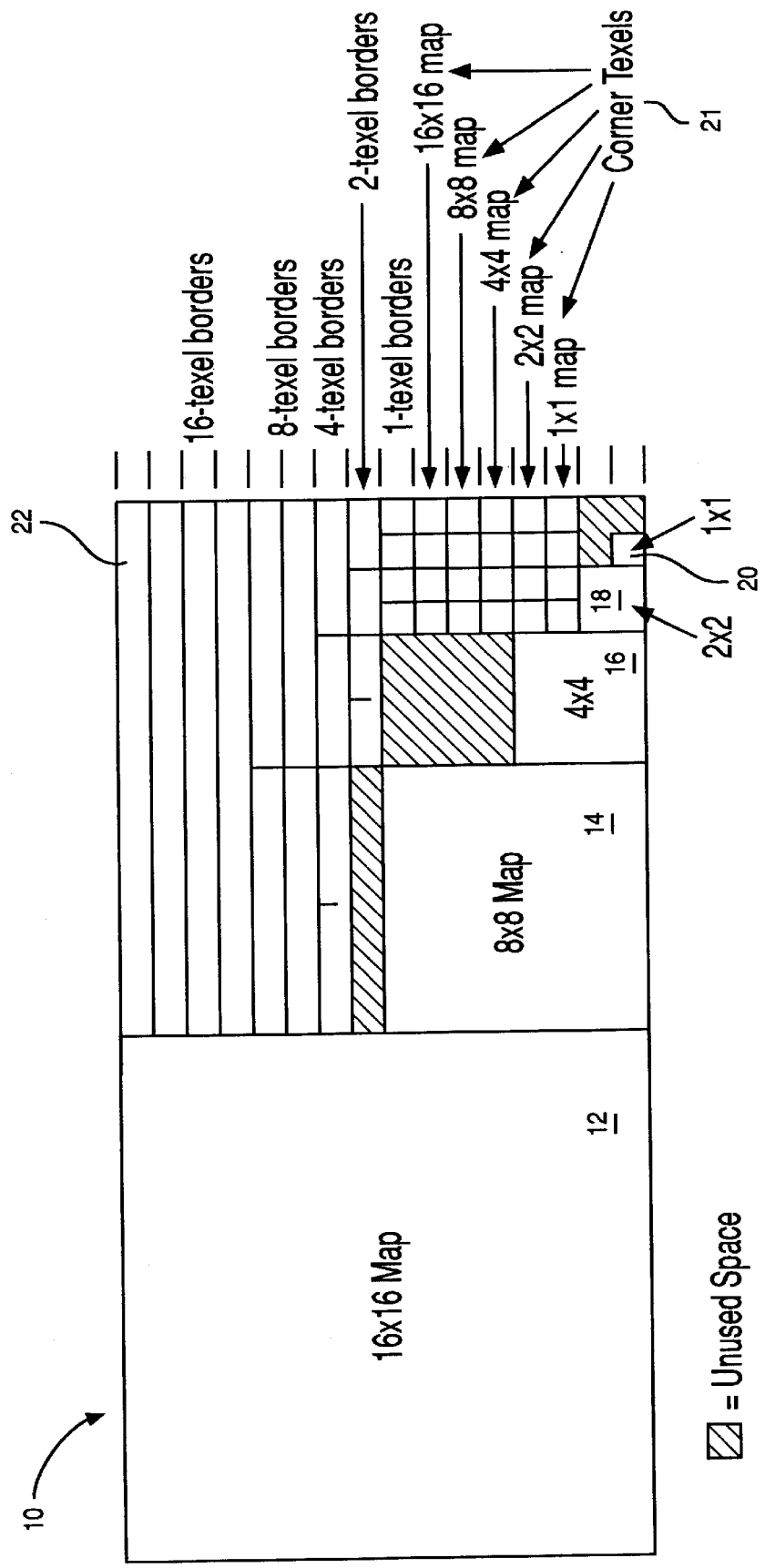
FIG. 1C is the modified rectangular mapping scheme for the present invention.

Referring now to FIG. 1C, there is shown a modified rectangular mapping scheme 10 for efficiently storing a texture map having a border. The modified rectangular mapping scheme 10 illustrates how a 16×16 texture map is stored using the present invention. The total memory required for storing a texture map, borders and submaps using the present invention is 2×W×H. This represents a large saving in memory space relative to the option of storing the texture map in a space twice as large, as required in the prior art. A texture map without borders requires 1.33×W×H for the texture map plus submaps using the present invention. As appreciated by those skilled in the art, the memory space requirements increase by a factor of 2.66 when the base map size is doubled. Referring back to FIG. 1C, the main 16×16 map (12) is stored on the left-hand portion of the rectangular map space. The submaps are aligned along the bottom edge 14, 16 and 18 of the map space in the right-hand portion of the map space. Beginning at the top of the right side 22 of the rectangular space, the borders associated with the edges are stored. These are only the edges of the borders, and not the corners. Thus, the four 16 texel borders are stored in the top four rows of the section. Below the 16-texel borders are the 8-texel borders, and so on down to 1-texel borders. The four corner texels from each map are stored starting in the lower-right corner 21 with the four corners of the 1×1 map.

Figure 2:
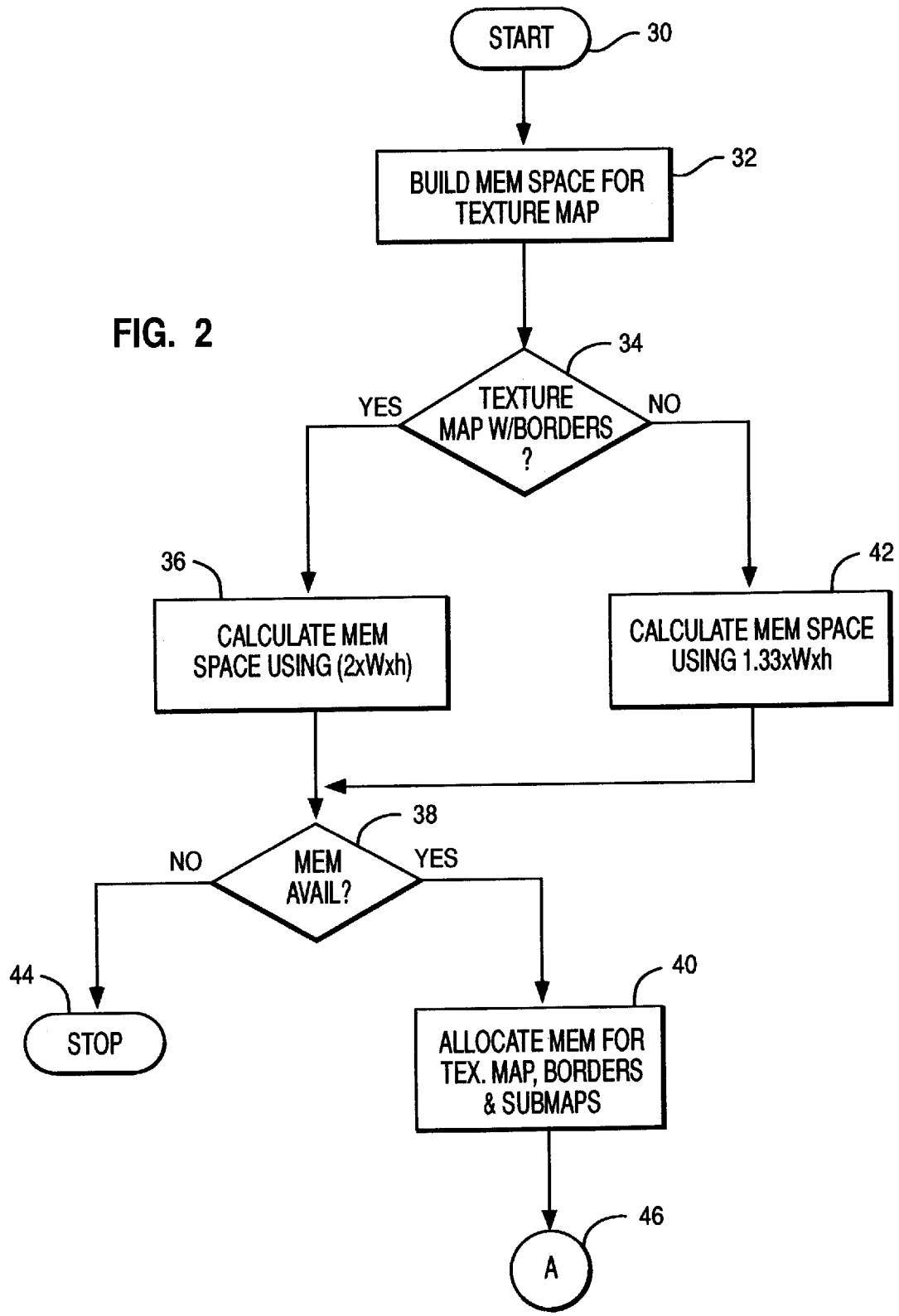
FIGS. 2 and 3 are flow diagrams for storing a texture map with borders in a rectangular address space.

Turning now to FIG. 2, a flow diagram is shown for storing a texture map with a border in the modified rectangular memory space of the present invention. The procedure starts at block 30 and immediately proceeds to block 32 where the procedure is invoked to build the rectangular memory space for a texture map. At block 34, the procedure checks to determine if the texture map contains a border. If NO, at block 42 the procedure calculates the required total memory space as 1.33×W×H. If the texture map contains a border, at block 36, the procedure calculates the total memory space as 2×W×H. At block 38, the procedure checks to determine if the calculated memory space is available. If NO, the procedure stops at block 44. If YES, at block 40, the procedure allocates the memory space for the texture map, submaps and borders.

Figure 3:
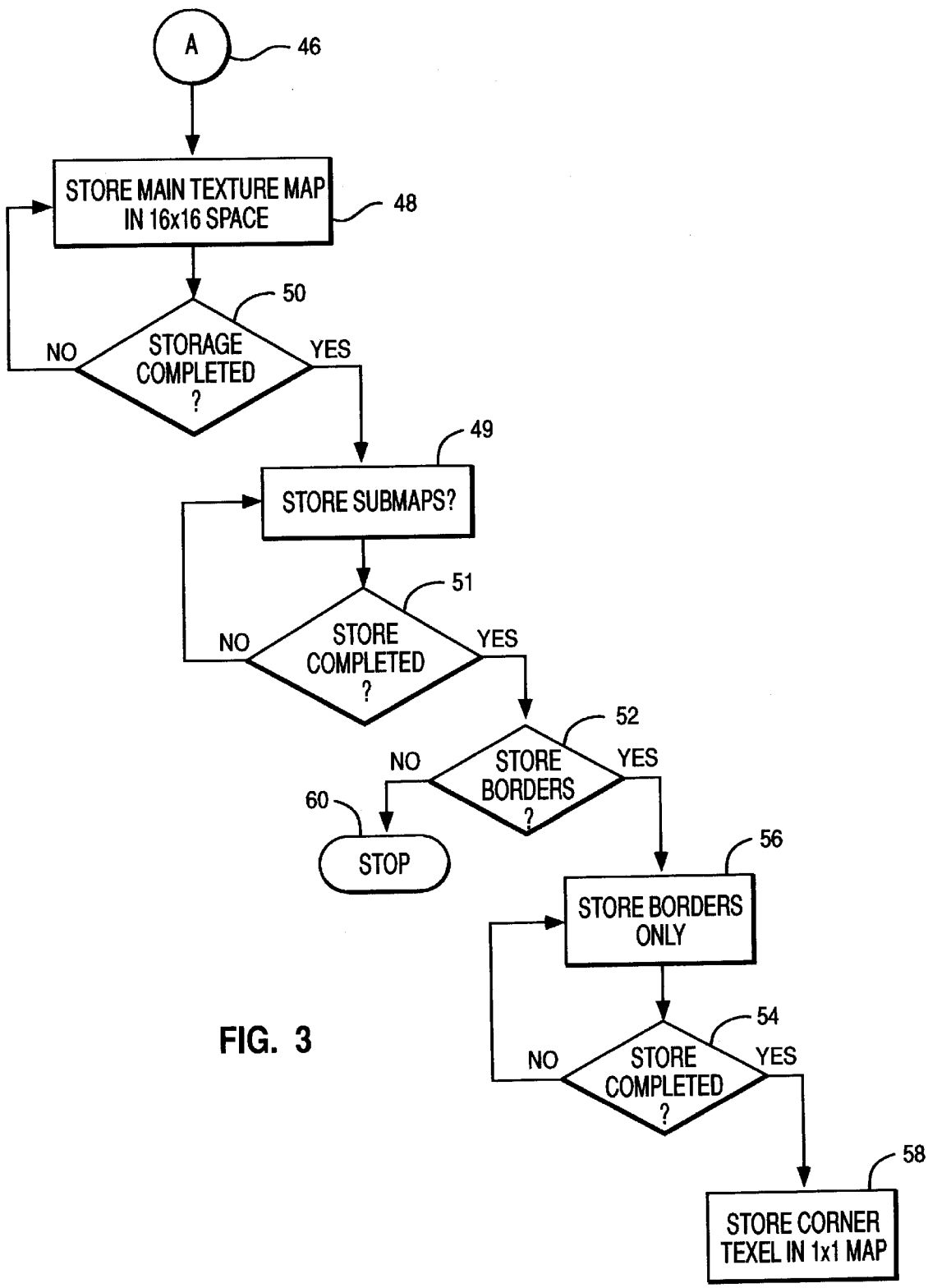

Turning now to FIG. 3, at block 48 the procedure stores the main texture map in the left-hand portion of the 16×16 memory space. At block 50, the procedure checks to determine if storage of the main texture map is completed. If NO, processing returns to block 48 where storage of the main texture map is continued. If storage of the main texture map is complete, processing proceeds to block 49 where the submaps for the main texture map are stored. At block 51, the procedure checks to determine if storage of the submaps is completed. If NO, processing returns to block 49 to continue storage of the submaps. If storage of the submaps is completed, processing proceeds to block 52 where the procedure checks to determine if the texture contains borders. If NO, the procedure stops at block 60. Else, processing proceeds to block 56 where the borders for the texture map is stored. At block 54, the procedure determines if storage of the borders is completed. If NO, processing returns to block 56. Else, processing proceeds to block 58 where the corner texels are stored.

One skilled in the art will appreciate that the present invention can be easily extended for operation in linear address space. The rectangular address space occupied by the texture map can be encapsulated for operation in linear address space. In other words, a coordinate is generated within the rectangle, which is turned into a linear offset within the rectangle (e.g., Offset=U+(V+Width), where U and V correspond to X and Y for the texture map). An example of the technique is illustrated in FIG. 4. V is shown greater than or equal to zero, and less than or equal to fifteen. U is shown greater than or equal to zero, and less than or equal to thirty-one. A coordinate (U,V) equals (18,6). This results in an address equal to 18+(6 times 32), which equals 210. The linear offset can be applied to a base address within linear memory. This provides a compromise between rectangular and linear memory mapping. This extension has the ease of address generation associated with rectangular mapping, and the improved ease of management associated with linear memory mapping.

Figure 5:
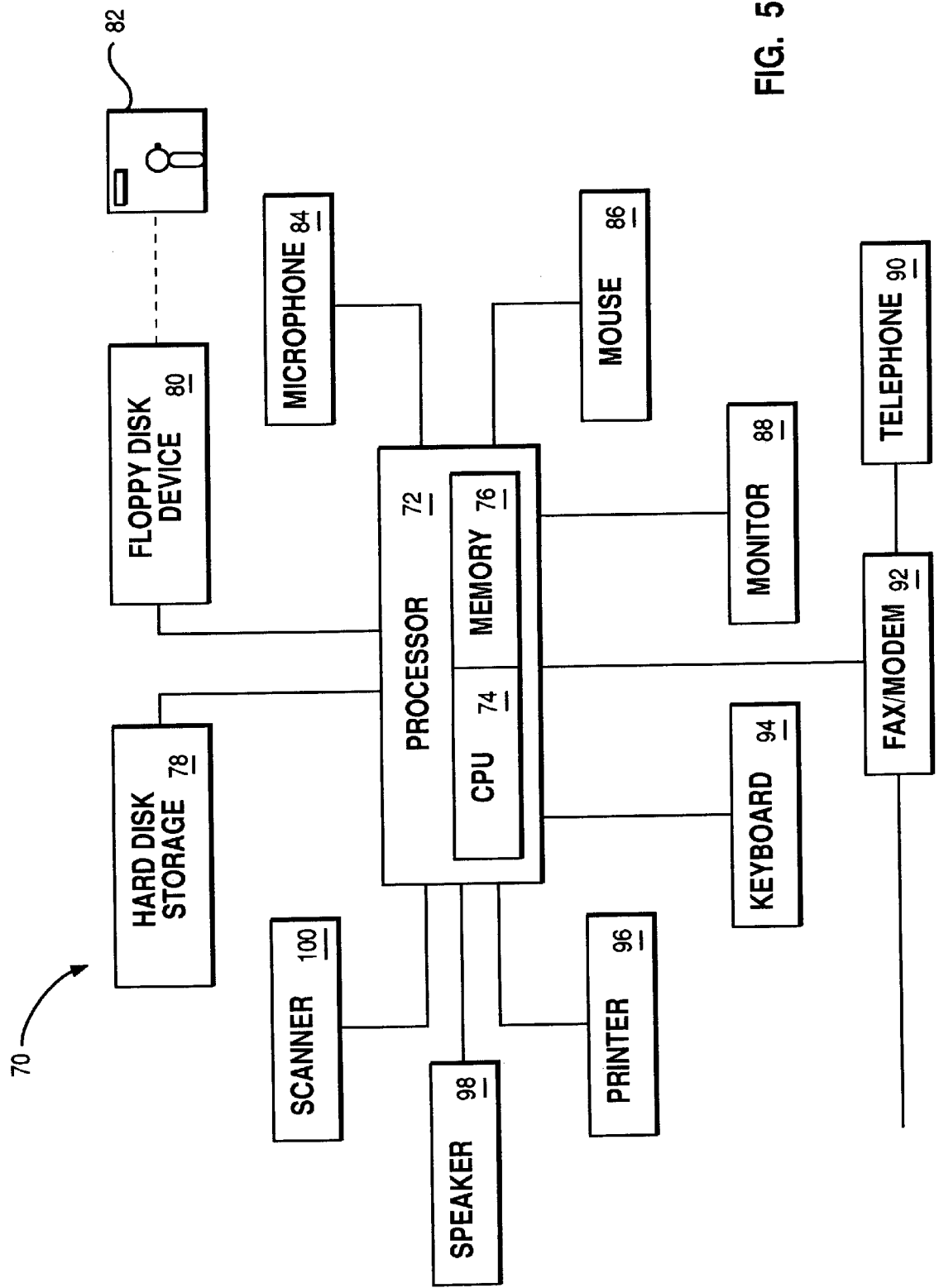
FIG. 5 is a workstation where the invention may be practiced.

Turning now to FIG. 5, there is shown a workstation 70 where the invention may be practiced. The workstation 70 contains a processor 72 having a CPU 74, connected to memory 76 for communicating with a plurality of Input/Output (I/O) devices. The hard disk storage 78 provides permanent storage of data/information for use by the processor 72. A floppy disk device 80 provides means for inputting data from a computer program product having a computer readable medium such as floppy diskette 82. One skilled in the art will appreciate that the computer program of this invention may be inputted to the processor 72, via the floppy diskette 82. A display monitor 88 is provided to allow a user to observe the execution of data on the processor 72. Data can also be inputted through microphone 84, keyboard 94, and scanner 100. Data displayed on monitor 88 can be manipulated using mouse 86. Output from programs operating on processor 72 may be obtained over printer 96 or speaker 98. The workstation 70 may be connected to a network over a fax/modem 92, which in turn may be connected to a telephone 90.

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A method, implemented in a computer, of storing a texture map having a border in said computer, comprising the steps of:

allocating a rectangular memory map in said computer for said texture map having a right-hand portion and a left-hand portion;

storing said texture map in said left-hand portion of said rectangular memory map, storing submaps of said texture map in one-half size portions in the right-hand portion of said rectangular memory map; and storing the borders of said texture map in the right-hand portion of said rectangular memory map.

2. The method of claim 1 further comprising the steps of:

storing a corner texel for said borders in the right-hand portion of said rectangular memory map.

3. The method of claim 1 wherein the step of allocating further comprises:

preparing memory space in said computer for said texture map, submaps and borders equaled to two-times the width times the height of said texture map to be stored.

4. The method of claim 1 wherein the step of allocating further comprises:

dividing said memory space of said rectangular memory map into said left-hand portion having a size equaled to the width times the height of the texture map.

5. The method of claim 1 wherein the step of storing the submaps of said texture map includes aligning the submaps along the bottom edge of the rectangular memory map in the right-hand portion of said rectangular memory map.

6. The method of claim 1 wherein the step of storing the borders of said texture map is at the top of the right-hand portion of said rectangular map space.

7. The method of claim 2 wherein the borders and edges of said texture map are stored in separate areas in the right-hand portion of said rectangular map space.

8. An apparatus for storing a texture map having a border in said computer, comprising:

means for allocating a rectangular memory map in said computer for said texture map having a right-hand portion and a left-hand portion;

means for storing said texture map in said left-hand portion of said rectangular memory map, means for storing submaps of said texture map in one-half size portions in the right-hand portion of said rectangular memory; and means for storing borders of said texture map in the right-hand portion of said rectangular memory map.

9. The apparatus of claim 8 further comprising:

means for storing a corner texel for said border in the right-hand portion of said rectangular memory map.

10. The apparatus of claim 8 further comprising:

means for preparing memory space in said computer for said texture map, submaps and borders equaled to two-times the width times the height of said texture map to be stored.

11. The apparatus of claim 9 further comprising:

means for dividing said memory space of said rectangular memory map into said left-hand portion having a size equaled to the width times the height of the texture map.

12. The apparatus of claim 10 further comprising:

means for storing the submaps of said texture map includes aligning the submaps along the bottom edge of the rectangular memory map in the right-hand portion of said rectangular memory map.

13. The apparatus of claim 10 further comprising:

means for storing the borders of said texture map at the top of the right-hand portion of said rectangular memory map.

14. A computer program product having a computer readable medium having computer program logic recorded thereon for storing a texture map having a border in said computer, comprising:

computer readable medium means for allocating a rectangular memory map in said computer for said texture map having a right-hand portion and a left-hand portion;

computer readable medium means for storing said texture map in said left-hand portion of said rectangular memory map, computer readable medium means for storing submaps of said texture map in one-half size portions in the right-hand portion of said rectangular memory;

computer readable medium means for storing the borders of said texture map in the right-hand portion of said rectangular memory map.

15. The computer program product of claim 14 comprising:

computer readable medium means for storing a corner texel for said border in the right-hand portion of said rectangular memory map.

16. The computer program product of claim 14 further comprising:

computer readable medium means for preparing memory space in said computer for said texture map, submaps and borders equaled to two-times the width times the height of said texture map to be stored.

17. The computer program product of claim 14 further comprising:

computer readable medium means for dividing said memory space of said rectangular map space into said left-hand portion having a size equaled to the width times the height of the texture map.

\* \* \* \* \*